United States Patent
Skorucak

(10) Patent No.: US 7,374,031 B2
(45) Date of Patent: May 20, 2008

(54) DOG-CLUTCH COUPLING DEVICE

(75) Inventor: Bela Skorucak, Cormeilles en Parisis (FR)

(73) Assignee: Thales (FR)

( * ) Notice: Subject to any disclaimer, the term of this patent is extended or adjusted under 35 U.S.C. 154(b) by 212 days.

(21) Appl. No.: 10/537,349

(22) PCT Filed: Dec. 10, 2003

(86) PCT No.: PCT/EP03/50976

§ 371 (c)(1),
(2), (4) Date: Jun. 6, 2005

(87) PCT Pub. No.: WO2004/055403

PCT Pub. Date: Jul. 1, 2004

(65) Prior Publication Data

US 2006/0081433 A1 Apr. 20, 2006

(30) Foreign Application Priority Data

Dec. 17, 2002 (FR) .................................... 02 15996

(51) Int. Cl.
*F16D 11/04* (2006.01)
(52) U.S. Cl. ............................... 192/54.52; 192/69.81; 192/93 A
(58) Field of Classification Search ............ 192/17 C, 192/42, 54.52, 69.81
See application file for complete search history.

(56) References Cited

U.S. PATENT DOCUMENTS

| 4,382,495 | A | 5/1983 | Fleitas | |
|---|---|---|---|---|
| 6,837,351 | B2 * | 1/2005 | Showalter et al. | 192/35 |
| 6,905,008 | B2 * | 6/2005 | Kowalsky et al. | 192/35 |
| 6,935,475 | B2 * | 8/2005 | Weilant | 192/35 |

FOREIGN PATENT DOCUMENTS

EP          0 947 733 A     10/1999

* cited by examiner

*Primary Examiner*—Richard M Lorence
(74) *Attorney, Agent, or Firm*—Lowe Hauptman Ham & Berner, LLP

(57) ABSTRACT

The invention relates to a device for coupling two shafts intended to rotate in the continuation of one another about an axis. The device comprises a dog clutch allowing the driving shaft to drive the driven shaft, and declutching means allowing the dog clutch to be uncoupled from a clutch-engaged position to a declutched position. The declutching means comprise at least one first channel secured to a driving element of the dog clutch, the first channel having the shape of a portion of a torus about the axis, at least one second channel secured to the driving shaft, the second channel having a helical shape about the axis element intended to roll between the first and in the second channel.

20 Claims, 4 Drawing Sheets

DOG-CLUTCH COUPLING DEVICE

CROSS-REFERENCE TO RELATED APPLICATIONS

The present Application is based on International Application No. PCT/EP2003/050976, filed on Dec. 10, 2003, which in turn corresponds to FR 02/15996 filed on Dec. 17, 2002, and priority is hereby claimed under 35 USC 119 based on these applications. Each of these applications are hereby incorporated by reference in their entirety into the present application.

FIELD OF THE INVENTION

The invention relates to a device for coupling two shafts intended to rotate in the continuation of one another. A dog clutch couples the two shafts. A dog clutch generally comprises teeth or dogs belonging to each of the two shafts. When the teeth (or dogs) collaborate with one another, the two shafts are coupled. A dog-clutch coupling device also comprises means for separating the teeth of each shaft in order to uncouple them. These means will be known as declutching means in the remainder of the description.

BACKGROUND OF THE INVENTION

Known declutching means entail stopping the rotation of the two shafts and applying a significant external force in order to separate the teeth. This is because the teeth are generally held in contact with one another by means of a spring and it is therefore necessary to overcome the force of the spring in order to declutch.

As a result, it is not possible to use a known dog-clutch coupling for coupling a starter motor with an engine if there is a desire to uncouple the starter motor when the engine has started.

SUMMARY OF THE INVENTION

It is an object of the invention to alleviate these drawbacks by proposing a dog-clutch coupling device for which the declutching means can uncouple the shafts even when these are rotating and in which the declutching means can uncouple the shafts automatically if the resistive torque between a driving shaft and a driven shaft reverses.

To this end, the subject of the invention is a device for coupling a driving shaft and a driven shaft which are intended to rotate with respect to a casing in the continuation of one another substantially about an axis, the device comprising a dog clutch allowing the driving shaft to drive the driven shaft and declutching means allowing the dog clutch to be uncoupled from a clutch-engaged position to a declutched position, characterized in that the declutching means comprise at least one first channel secured to a driving element of the dog clutch, the first channel having the shape of a portion of a torus about the axis, at least one second channel secured to the driving shaft, the second channel having a helical shape about the axis, and a rolling element intended to roll between the first and in the second channel.

The invention also makes it possible considerably to reduce the force necessary for declutching. By virtue of the invention, the force needed to separate the teeth of the dog clutch is provided no longer by means external to the device but by the device itself and, more specifically by the rotational energy of the shafts.

The invention also makes it possible significantly to reduce the mass of the declutching means and to improve their compactness.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The invention will be better understood and other advantages will become apparent from reading the detailed description of one embodiment of the invention, given by way of example, the description being illustrated by the attached drawing in which:

FIG. 1 depicts a coupling device in section along a plane containing an axis 1 about which two shafts 2 and 3 can rotate with respect to a casing 4. The shaft 2 is, for example, that of the rotor of an electric motor used as a starter motor. A rotary bearing comprising, for example, a rolling bearing assembly 7 allows the shaft 2 to rotate with respect to the casing 4, the rotation being about the axis 1. The shaft 3 makes it possible, for example, to couple the electric motor to a transfer box (not depicted).

DETAILED DESCRIPTION OF THE INVENTION

Figure 1:
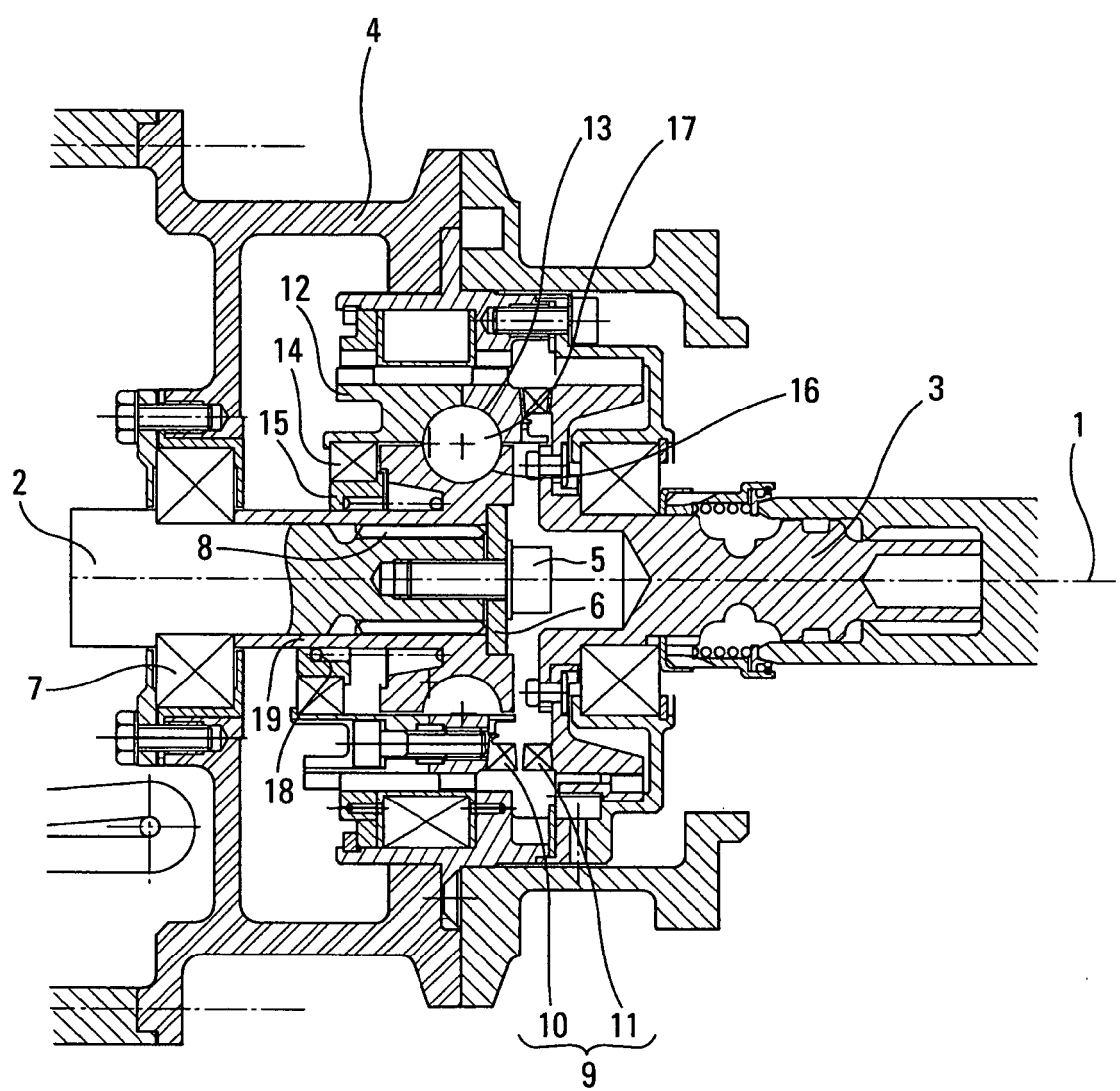
FIG. 1 depicts a coupling device according to the invention, in section along the axis of the two shafts; the upper part of the section depicts the coupling device in the clutch-engaged position and the lower part of the section represents the coupling device in the declutched position.

A dog clutch 9 allows the shafts 2 and 3 to be coupled and uncoupled. According to the example depicted, the dog clutch 9 comprises a first series of teeth 10 secured to a driving element 12 of the dog clutch 9 and a second series of teeth 11 secured to the shaft 2. The teeth 10 and the teeth 11 collaborate with one another in such a way as to allow the shaft 2 to be driven by the shaft 3 when the coupling device is in the clutch-engaged position.

Declutching means allow the teeth 10 and 11 to be uncoupled. The declutching means comprise at least one first channel 13, secured to the driving element 12, and having the shape of a portion of a torus about the axis 1. The declutching means also comprise at least one second channel 16 secured to the shaft 2. The second channel 16 has a helical shape about the axis 1. The declutching means also comprise a rolling element 17 intended to roll between the first and the second channels 13 and 16. The rolling element 17 is advantageously a spherical ball. An elastic element such as, for example, a helical spring 18 tends to keep the teeth 10 and 11 uncoupled. The helical spring 18 bears between the driving shaft 2 and the driving element 12 of the dog clutch 9. The driving element 12 can move in a helix with respect to the shaft 2 about the axis 1. It is possible to provide a component of revolution 14 about the axis 1, free to rotate with respect to the driving element 12. The helical spring 18 then bears against the driving element 12 via the component of revolution 14 which, driven by the helical spring 18, constantly turns at the same rotational speed as the shaft 2 about the axis 1. The rotational freedom of the component of revolution 14 with respect to the driving element 2 may be afforded by a thrust ball bearing 15.

When the teeth 10 and 11 of the dog clutch 9 are coupled and the shaft 2 is driving, that is to say exerting a driving torque on the shaft 3, the driving element 12 is braked in its rotation about the axis 1 by the teeth 11 secured to the shaft 3. The braking of the driving element 12 tends to move the driving element 12 with respect to the shaft 2 in its helical movement so that the teeth 10 and 11 remain coupled.

By contrast, when the shaft 2 no longer exerts a driving torque on the shaft 3, the spring 18 tends to move the driving element 12 with respect to the shaft 2 in its helical movement in the opposite direction to the movement previously described such that the teeth 10 and 11 uncouple. The uncoupling of the teeth 10 and 11 takes place automatically when the shaft 2 ceases to exert a driving torque on the shaft 3. The automatic uncoupling is useful when, for example, the shaft 2 is that of a starter motor and the shaft 3 is that of an engine that the starter motor is to start. Initially, the starter motor drives the engine and the dog clutch 9 remains coupled. Then, when the engine has started up, the dog clutch 9 automatically uncouples itself without external intervention.

Advantageously, the second channel 16 is made in a sleeve 19 attached to the shaft 2. The sleeve 19 is secured to the shaft 2. A connection in terms of rotation about the shaft 1 between the sleeve 19 and the shaft 2 is made, for example, using splines 8. The sleeve 19 is prevented from effecting any translational movement with respect to the shaft 2, for example, by means of a screw 5 screwed into the shaft 2 and the head of which presses against the sleeve 19 via a washer 6. The sleeve 19 may advantageously act as a thrust face for the interior cage of the rolling bearing assembly 7.

Advantageously, the coupling device comprises three first channels 13 distributed uniformly about the axis 1, three second channels 16 distributed in the same way as the three first channels 13, and three rolling elements 17.

Figures 2A, 2B:
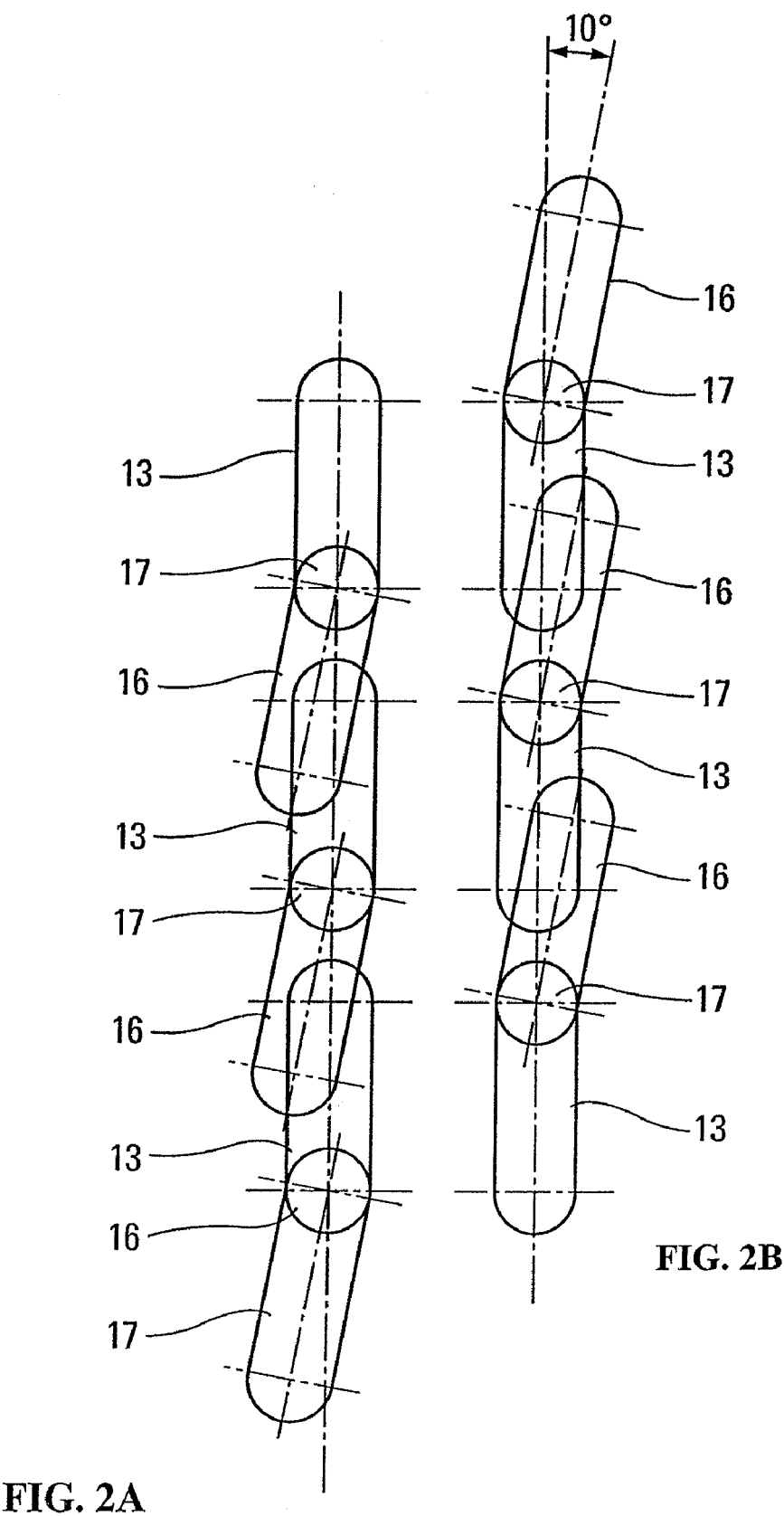
FIGS. 2a and 2b depict the channels and the rolling element in development about the axis of rotation of the shafts.

More specifically, a rolling element 17 can roll between one of the three first channels 13 and one of the three second channels 16. The same is true of the other channels 13 and 16 which all operate, in pairs, with a rolling element 17 between each channel 13 and 16 of the pair. The three pairs of channels 13 and 16 and their associated rolling element 17 are depicted in FIGS. 2a and 2b in development about the axis 1. FIG. 2a depicts the declutched position and FIG. 2b depicts the clutch-engaged position. FIGS. 2a and 2b show the three channels 13 made in the continuation of one another and running at right angles to the axis 1. Also visible is the helical shape of the three channels 16. The helix angle of the channels 16 is, for example, 10°.

Advantageously, the teeth of each series have complementing triangular shapes, the shapes are made in such a way that when the driving shaft 2 drives the driven shaft 3, a continuation of each contacting surface of each series of teeth contains the axis 1.

Figure 3:
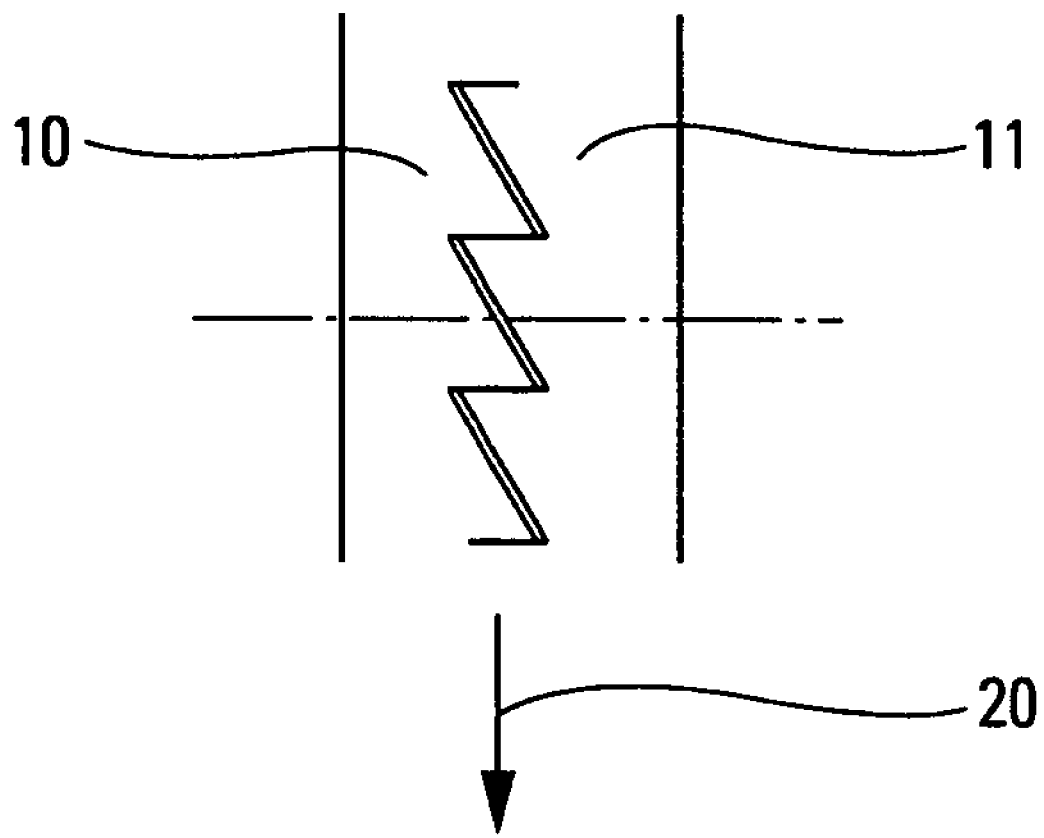
FIG. 3 depicts one exemplary embodiment of the teeth of the dog clutch.

An example of a tooth shape is clearly visible in FIG. 3. In other words, when the driving shaft 2 drives the shaft at 3, each tooth 10 exerts a force on a corresponding tooth 11 in a direction at right angles to the axis 1. Conversely, if the driven shaft tends to drive the driving shaft, each tooth 11 exerts a force on a corresponding tooth 10 in a direction such that a component of this force tends to separate the two series of teeth 10 and 11 and therefore tends to declutch. FIG. 3 is a partial development about the axis 1. The direction of rotation of the shafts is indicated by the arrow 20.

When the device is stationary, the teeth 10 and 11 of the dog clutch 9 are uncoupled because of the action of the helical spring 18 which keeps the driving element 12 in the position depicted in the lower part of FIG. 1, known as the declutched position. The spring stiffness of the helical spring 18 can be selected such that when the driving shaft 2 is set in motion, the inertia of the driving element 12 is enough for the rolling elements 17 to move in the channels 13 and 16 and for the driving element 12 to leave the declutched position and approach the clutch-engaged position depicted in the upper part of FIG. 1. Even if the inertia of the driving element 12 is not enough to reach the clutch-engaged position, all that is required is for the teeth 10 and 11 to come into contact with one another to cause the inertia of the driving element 12 to increase and the driving element 12 therefore to reach the clutch-engaged position.

The shaft 2 may be set in motion even if the driven shaft 3 is not stationary. In this case, when the speed of the driven shaft 3, becomes equal to the speed of the shaft 2, engagement takes place.

Advantageously, clutch engagement can be improved when the driving shaft 2 is set in motion by arranging within the device a brake 21 intended to slow the driving element 12 in its rotation with respect to the driving shaft 2. In practice, the brake 21 can be placed inside the casing 4 and brake the rotation of the driving element 12. By braking the driving element 12 with respect to the casing 4, the driving element 12 is slowed with respect to the driving shaft 2 when the driving shaft 2 is set in motion. The brake is, for example, of the reluctance type so as to avoid any mechanical friction between the casing 4 and the driving element 12. In one embodiment given by way of example and depicted in figure 4, the brake 21 comprises a plurality of slots 22 made in a magnetic material belonging to the driving element 12, a plurality of permanent magnets 23 secured to the casing 4 and in interaction with the magnetic material.

The slots 22 are situated on an exterior cylindrical part 24 of the driving element 12, which cylindrical part 24 is of the axis 1. The cylindrical part 24 is made of the magnetic material. The permanent magnets 23 are situated in an interior cylindrical part 25 of the casing 4. The interior cylindrical part 25 is also of the axis 1 so that when the driving element 12 rotates inside the casing 4, each permanent magnet 23 interacts magnetically with a slot 22 then with a solid part 26 of the magnetic material of the driving element 12 alternately. A solid part 26 separates two slots 22 and there are as many slots 22 as there are solid parts 26 on the exterior cylindrical part 24. The alternating interaction of the permanent magnets 23 with the slots 22 and with the solid parts 26 generates forces which tend to slow the driving element 12 in its rotation about the axis 1.

Advantageously, the coupling device comprises means allowing the driving element 12 to rotate in just one direction of rotation about the axis 1.

These means are also known as a free wheel. These means comprise, for example, at least one roller 27 free to rotate with respect to a cage 28 secured to the casing 4, a surface of revolution 29 belonging to the driving element 2 and the axis of which is coincident with the axis 1 of rotation of the driving element, a ramp 30 belonging to the casing 4 and inclined with respect to a tangent to the surface of revolution 29 at a region on the surface of revolution where the roller 27 is liable to roll, and an elastic element 31 opposing the movement of the roller 27 along the ramp 30.

Figure 4:
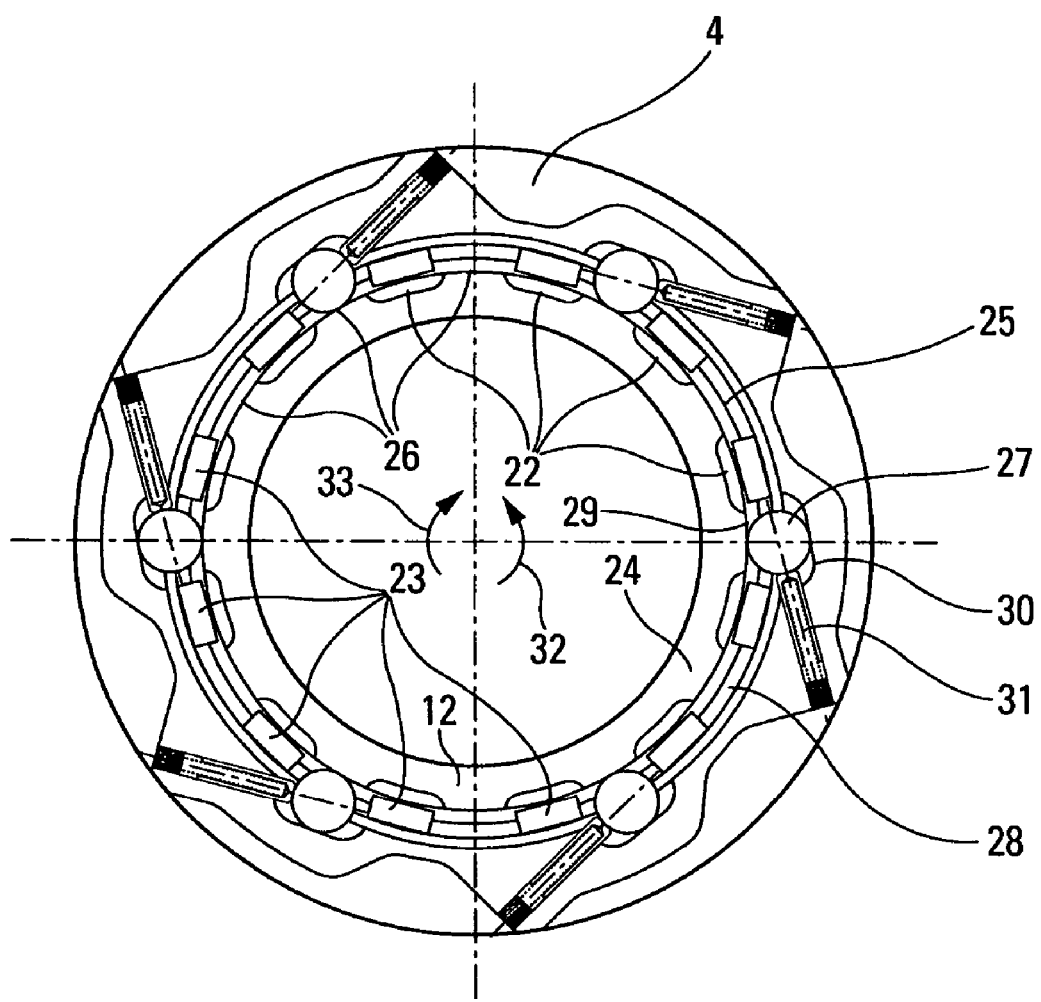
FIG. 4 depicts, in section at right angles to the axis of rotation of the shafts, means for braking the driving element and free wheel means.

In FIG. 4, six rollers 27 have been depicted with their ramp 30 and their respective elastic element 31. The surface of revolution 31 is common to all the rollers 27.

When the driving element 12 attempts to rotate in the direction illustrated by the arrow 32, the rollers 27 become wedged between their respective ramps 30 and the surface of revolution 29 and rotation is impossible. By contrast, when the driving element 12 attempts to rotate in the opposite direction, that is to say the direction illustrated by the arrow 33, the rollers 27 are able to roll freely between the surface of revolution 29 and their respective ramps. In this direction 33, the driving element 12 is able to rotate.

In addition, when the surface of revolution 29 is near the slots 22 and the solid parts 26, so that there can be magnetic interaction between the rollers 27 and the surface of revolution, rotation of the driving element 12 tends to move the rollers 27 away from the surface of revolution 29, thereby compressing the elastic element 31. This makes it possible to avoid any friction in the rotation of the driving element 12 with respect to the casing 4.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. Device for coupling a driving shaft and a driven shaft which are intended to rotate with respect to a casing in the continuation of one another substantially about an axis, the device comprising:
   a dog clutch allowing the driving shaft to drive the driven shaft; and declutching means allowing the dog clutch to be uncoupled from a clutch-engaged position to a declutched position,
   wherein the declutching means comprise at least one first channel secured to a driving element of the dog clutch, the first channel having the shape of a portion of a torus about the axis, at least one second channel secured to the driving shaft, the second channel having a helical shape about the axis, and a rolling element intended to roll between the first and in the second channel.

2. The coupling device as claimed in claim 1, wherein the rolling element is a spherical ball and in that a cross section of each channel is a portion of a circle of radius more or less equal to that of the spherical ball.

3. The coupling device as claimed in claim 1, wherein it comprises three first channels distributed uniformly about the axis, three second channels distributed in the same way as the three first channels, and three rolling elements.

4. The coupling device as claimed in claim 1, wherein the dog clutch comprises a first series of teeth secured to the driving shaft and a second series of teeth secured to the driven shaft, the teeth in each series have complementing triangular shapes, the shapes are produced in such a way that when the driving shaft drives the driven shaft a continuation of each contacting surface of each series of teeth contains the axis.

5. The device as claimed in claim 1, wherein it comprises a brake intended to slow the driving element in its rotation with respect to the driving shaft.

6. The device as claimed in claim 5, wherein the brake is of the reluctance type.

7. The device as claimed in claim 6, wherein the brake comprises a plurality of slots made in a magnetic material belonging to the driving element, a plurality of permanent magnets secured to the casing and in interaction with the magnetic material.

8. The device as claimed in claim 1, wherein it comprises means allowing the driving element to rotate in just one direction of rotation about the axis.

9. The device as claimed in claim 7 comprises means allowing the driving element to rotate in just one direction of rotation about the axis, wherein the means that allow the driving element to rotate in just one direction of rotation about the axis comprise at least one roller free to rotate with respect to a cage secured to the casing, a surface of revolution belonging to the driving shaft and the axis of which is coincident with the axis of rotation of the driving element, a ramp belonging to the casing and inclined with respect to a tangent in the surface of revolution at a region on the surface of revolution where the roller is liable to roll, and an elastic element opposing the movement of the roller along the ramp.

10. The device as claimed in claim 9, wherein the surface of revolution is near the slots and solid parts of magnetic material so that there can be magnetic interaction between the rollers and the surface of revolution.

11. The coupling device as claimed in claim 2, wherein it comprises three first channels distributed uniformly about the axis, three second channels distributed in the same way as the three first channels, and three rolling elements.

12. The coupling device as claimed in claim 2, wherein the dog clutch comprises a first series of teeth secured to the driving shaft and a second series of teeth secured to the driven shaft, the teeth in each series have complementing triangular shapes, the shapes are produced in such a way that when the driving shaft drives the driven shaft a continuation of each contacting surface of each series of teeth contains the axis.

13. The coupling device as claimed in claim 3, wherein the dog clutch comprises a first series of teeth secured to the driving shaft and a second series of teeth secured to the driven shaft, the teeth in each series have complementing triangular shapes, the shapes are produced in such a way that when the driving shaft drives the driven shaft a continuation of each contacting surface of each series of teeth contains the axis.

14. The device as claimed in claim 2, wherein it comprises a brake intended to slow the driving element in its rotation with respect to the driving shaft.

15. The device as claimed in claim 3, wherein it comprises a brake intended to slow the driving element in its rotation with respect to the driving shaft.

16. The device as claimed in claim 4, wherein it comprises a brake intended to slow the driving element in its rotation with respect to the driving shaft.

17. The device as claimed in claim 2, wherein it comprises means allowing the driving element to rotate in just one direction of rotation about the axis.

18. The device as claimed in claim 3, wherein it comprises means allowing the driving element to rotate in just one direction of rotation about the axis.

19. The device as claimed in claim 4, wherein it comprises means allowing the driving element to rotate in just one direction of rotation about the axis.

20. The device as claimed in claim 5, wherein it comprises means allowing the driving element to rotate in just one direction of rotation about the axis.

* * * * *